March 4, 1969     R. H. FORNEY     3,430,655

MONOBLOCK VALVE

Filed April 11, 1967

INVENTOR
*ROSS FORNEY*
BY
*Richard H. Thomas*
ATTORNEY

United States Patent Office 3,430,655
Patented Mar. 4, 1969

3,430,655
MONOBLOCK VALVE
Ross H. Forney, Dallas, Tex., assignor to Forney Engineering Company, Dallas, Tex., a corporation of Texas
Filed Apr. 11, 1967, Ser. No. 629,973
U.S. Cl. 137—625.47                    6 Claims
Int. Cl. F16k 5/08; F23c 11/00

ABSTRACT OF THE DISCLOSURE

A valve particularly suitable for oil burners comprising a valve body and rotatable valve plug, at least two ports on one side of the valve body and at least three ports on the opposite side of the valve body, two of the last-mentioned ports being opposite the first-mentioned ports, the plug including passageways connecting the body opposing ports when the plug is in one position, and at least one channel connecting said three ports to each other when the plug is in a second position.

---

The present invention relates to a novel valve for use with oil burners, including marine oil burners.

It is a requirement of fuel oil burners that the oil lines connected to the burner be purged with steam when the burner is shut down, partly to keep the lines hot. In some applications, it is also a requirement to provide for steam atomizing of the oil, and/or means for keeping the oil in circulation, even when the burner is shut down. In this latter instance, where the load on the boiler may vary widely, it may be desired to feed to a burner a constant amount of oil, and recirculate a variable amount depending upon and coordinated with boiler load.

In the past, it has been conventional practice to use a plurality of individual valves for these purposes. It is possible for these individual valves to be incorrectly sequenced or in incorrect relative positions if the mechanism interconnecting the valves fails. This and other disadvantages are overcome in accordance with the present invention, by providing a single valve which achieves the functions of and replaces the plurality of valves conventionally used in oil burner supply systems.

In accordance with the invention there is provided a valve comprising a valve body having a seat of circular cross section, a plug also of circular cross section rotatable within the valve body seat, and means for rotating the plug. Stop means are associated with the body and plug whereby the travel of the plug is limited to a predetermined amount between an open and closed position. The valve body has a burner side and a supply side, the supply side comprising upper and lower ports. On the burner side, the valve body is provided with upper and lower ports opposite the supply side ports, and a center port between the upper and lower ports. In an open position, upper and lower passageways in the valve plug connect the supply side and burner side upper and lower ports, and in a closed position, at least one channel in the valve plug connects the center port and upper and lower ports on the burner side. In an embodiment in accordance with the invention, a second channel opposite the first-mentioned channel connects the upper and lower ports on the supply side of the valve.

Figure 1:
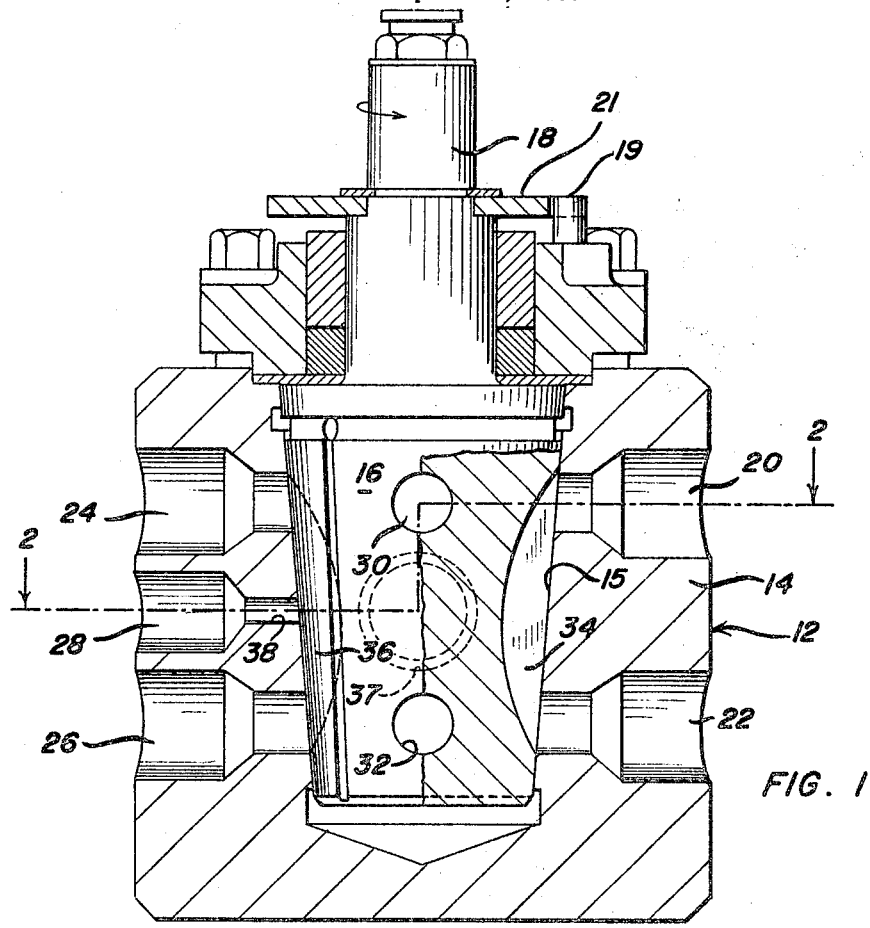
Figure 2:
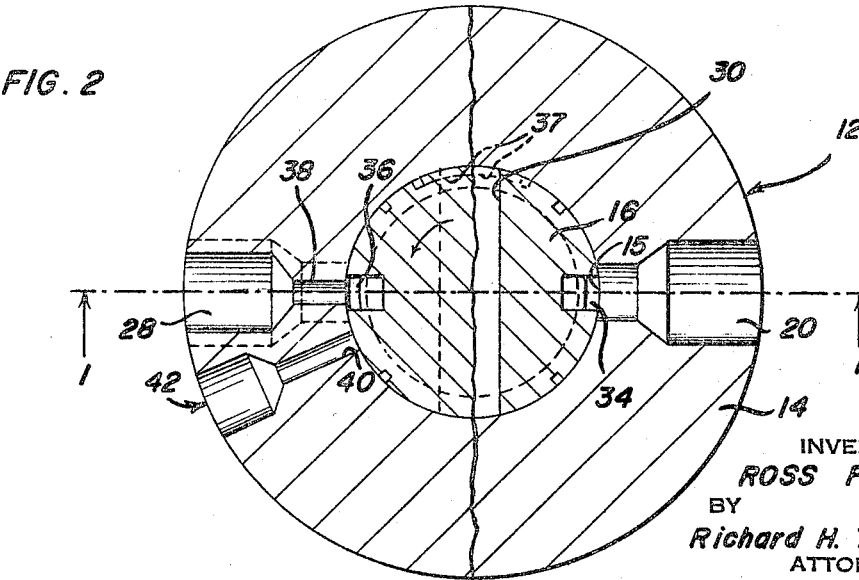

The invention and advantages thereof will become apparent upon further consideration of the specification, with reference to the accompanying drawings, in which FIGURE 1 is a vertical section view, partly broken away, to show the valve body and plug arrangement in accordance with the invention; and FIGURE 2 is a section view taken along line 2—2 of FIGURE 1.

Referring to the drawings, the valve 12 comprises a body portion 14 in which there is bored a seat having frusto-conical walls 15 and a circular cross section. A valve plug 16 is provided with the same frustoconical circular shape as the seat, and is adapted to rotate within the seat. Attached to the plug, a suitable drive means, not shown, drives valve stem 18 and rotates the plug, preferably between open and closed positions at ninety degrees (90°) with respect to each other. Stop pin 19 is provided on the valve body 14 contacting stop disc 21 on the valve stem 18, adapted to limit the amount of travel of the valve plug within the valve body.

The valve body on one side, which can be referred to as the supply side of the valve (the right hand side in the drawing), is provided with two ports, upper ports 20 and lower port 22. On the opposite side of the valve body, which can be referred to as the burner side (the left hand side in the drawing), the valve body is provided with upper and lower ports 24 and 26, which are in alignment with the ports 20 and 22 on the supply side or right hand side of the valve body. Also provided on the burner side is a center port 28 about half-way between the upper and lower ports 24 and 26 respectively. Passageways 30 and 32 in the valve plug connect the ports 20 and 22 to the ports 24 and 26 respectively when the plug is in a first or open position [ninety degrees (90°) to the position shown].

Rotated back ninety degrees (90°), to the position shown, the valve plug is provided with a channel 36 and optionally channel 34 on opposite sides of the plug communicating the ports 20 and 22 on the supply side (right hand side) with each other, and the ports 24, 26 and center port 28, on the burner side (left hand side) with each other. This position of the valve plug can be referred to as the valve second or closed position; i.e., when the center port 28 is in communication with the upper and lower ports 24 and 26 on the burner side. In the embodiment or optional design mentioned, the right hand side ports 20 and 22 may also be in communication with each other, if channel 34 is provided.

The valve plug 16 also is provided with a drain channel 37 which is disposed in the side of the plug facing the burner side ports (the left hand side) when the valve is in an open position [ninety degrees (90°) to the position shown]. This channel, which is an annular depression in the wall of the plug, encompasses opening 38 of center port 28, and further communicates with a drain opening 40, in the same horizontal plane with center port 28, but circumferentially slightly to the side of the center port. Any leakage of oil between the plug and valve body walls into the proximity of opening 38 (of center port 28) is drained into drain 40 and through connection 42. In operation, the port 28 is connected to a steam supply source and the channel 37 and drain connection 42 prevent the leakage of high pressure oil into this source.

System I

In operation, in accordance with one oil feed system for a burner, it is desired to be able to purge the oil lines to the burner with steam for the purpose of cleaning and keeping them hot when the burner is not in use. A second requirement of this system is to permit recirculation of a continuous flow of oil when the burner is shut down for the purpose of maintaining the lines heated and a proper oil viscosity.

In this system, oil is fed to inlet port 20 of the valve, and when the burner is in operation and valve 12 is open, the oil is transmitted to the burner through port 24 by a passageway 30. A variable amount of oil is diverted at the burner depending upon the boiler load, and excess oil is returned to the return system through port 26, passageway 32 and port 22. Channel 37 and drain connection 40 function to prevent the leakage of high pressure oil into the steam connection 28.

When the burner is shut down, the valve plug 16 is in a closed position (the position shown), at approximately 90° to the open position. Constant recirculation of the oil is maintained by transmitting the flow entering port 20 to port 22 via channel 34 in the valve plug. On the burner side of the valve, steam is admitted to center port 28, which is transmitted to both ports 24 and 26 via channel 36 in the plug, to purge and clean the lines to the burner and to maintain the lines at an elevated temperature.

System II

In a slightly different oil supply system for a burner, it is desired to provide steam atomizing of the oil and purging of the oil lines to the burner in the two operating conditions, firing of the burner and shutdown, respectively. During firing, in this system, oil is admitted at inlet port 20 on the supply side of the valve, and is transmitted to port 24 on the burner side by passageway 30 in the valve plug. Steam is admitted at inlet port 22 on the supply side of the valve, and is transmitted to port 26 on the burner side via passageway 32 in the valve plug. Following shutdown of the burner, purge steam is admitted, as with System I, into center port 28, and is transmitted to upper and lower ports 24 and 26 via channel 36 in the valve plug.

In this system, channel 34 in the valve plug is omitted. Oil and atomizing steam flows to the burner are thereby shut-off when the burner is not firing, and there is no by-pass channel connecting ports 20 and 22.

In particular the valve is unique in being a multipurpose valve controlling two or more fluids satisfying multiple functional operations.

It is apparent from the above, that the invention provides an extremely versatile valve useful for a variety of oil burner oil supply systems, and that the valve achieves a number of functions heretofore handled by a plurality of individual valves.

The valve also is unique in that in a single construction it provides absolutely positive interlock between two or more fluids being introduced into the burner. With a multiplicity of individual valves, it would be possible for those individual valves to be incorrectly sequenced or to be in incorrect relative positions if the mechanism interconnecting the valves failed. With the single plug construction, such a misoperation is not possible. The valve is also unique in that it provides shrouding by means of channels connected to a drain, on critical fluid ports into which leakage of other fluids cannot be permitted. The valve further is unique in that it also incorporates an overlap of fluid closed porting in the closed direction, so that fluid shutoff can be positively sensed after the fluid is shut off. This permits positive intelligence to a control system that the fluid flow has been stopped.

Although the invention has been described with respect to a particular embodiment, many variations within the scope of the following claims will be apparent to those skilled in the art.

What is claimed is:
1. A valve comprising
    a valve body;
    a valve seat within said body having a circular cross section;
    a valve plug rotatable within said seat also having a circular cross section;
    means for rotating said plug;
    stop means associated with said valve body and valve plug whereby the rotation of said plug is limited to a predetermined amount between an open and a closed position;
    the valve body including a burner side and a supply side;
    upper and lower ports on said supply side;
    upper and lower ports on the burner side and at least one center port intermediate said burner side upper and lower ports;
    passageway means in the valve plug connecting, in a first open position for the valve plug, the upper ports of the burner and supply sides and the lower ports of the burner and supply sides; and
    first channel means in the valve plug connecting the burner side upper and lower ports with said center port when the valve is in a second position.
2. A valve according to claim 1 including
    second channel means opposite said first channel means connecting the supply side upper and lower ports when the valve plug is in said second position.
3. A valve according to claim 1 including third channel means comprising an annular groove in the wall of the valve plug positioned to encompass said burner side center port when the valve plug is in said first open position, the valve body further including drain port means in communication with said annular groove when the plug is in said first open position.
4. A valve according to claim 1 wherein said valve body seat and valve plug have a frustoconical vertical cross section.
5. A valve according to claim 1 wherein said passageways in the valve plug are at right angles to the plane of said opposite channel means, said valve plug being adapted to rotate 90°.
6. A valve according to claim 1 wherein said first and second channel means comprise elongated channels in the valve plug wall extending between and coextensive with said valve body upper and lower ports.

References Cited

UNITED STATES PATENTS

| | | | |
|---|---|---|---|
| 2,137,406 | 11/1938 | Johnson | 137—625.29 X |
| 2,886,011 | 5/1959 | Radford | 137—625.47 X |

M. CARY NELSON, *Primary Examiner.*

M. A. STURM, *Assistant Examiner.*